United States Patent
Olsen et al.

[11] 3,889,076
[45] June 10, 1975

[54] COMBINATION OF A PRESSURIZED-GAS INSULATED HIGH-VOLTAGE SWITCHING INSTALLATION AND A MULTI-POLE GROUNDING SWITCH DEVICE

[75] Inventors: Willi Olsen; Dieter Lorenz; Heinz Beer, all of Berlin, Germany

[73] Assignee: Siemens Aktiengesellschaft, Munich, Germany

[22] Filed: Nov. 16, 1973

[21] Appl. No.: 416,524

[30] Foreign Application Priority Data
Nov. 30, 1972  Germany............................ 2259056

[52] U.S. Cl............................................. 200/48 R
[51] Int. Cl. ............................................ H01h 21/28
[58] Field of Search .......... 200/48 R, 148 R, 148 B, 200/148 A, 163

[56] References Cited
UNITED STATES PATENTS
3,103,569   9/1963   Reichardt ........................... 200/163
3,761,651   9/1973   Fournier ............................ 200/48 R Primary Examiner—Herman J. Hohauser
Attorney, Agent, or Firm—Kenyon & Kenyon Reilly Carr & Chapin

[57] ABSTRACT

The combination of a pressurized-gas insulated high-voltage installation having a metal housing for accommodating a plurality of phase-conductors and of at least one multi-pole grounding switch device including a plurality of ground switching pins corresponding to respective ones of the phase-conductors. Each of the switching pins is movable between open and closed positions to respectively disconnect and connect the corresponding phase-conductor electrically with the metal housing, the switching pins being disposed in a radially extending plane transverse to the metal housing and being arranged in spaced relation one from the other about the periphery of the housing.

4 Claims, 2 Drawing Figures

COMBINATION OF A PRESSURIZED-GAS INSULATED HIGH-VOLTAGE SWITCHING INSTALLATION AND A MULTI-POLE GROUNDING SWITCH DEVICE

BACKGROUND OF THE INVENTION

The invention relates to a pressurized-gas insulated high-voltage switching installation for several phase-conductors. The switching installation is equipped with a metal housing and at least one multi-pole encapsulated grounding switch device is provided. The switching device has grounding switch pins which are movable into a closed position for electrically connecting corresponding ones of the phase-conductors to the metal housing.

High voltage switching installations of this type are known wherein the metal housing is at ground potential and includes the three grounding switch pins arranged one behind the other in the direction of the longitudinal axis of the metal housing which coact with the corresponding phases. The known installation operates both safely and successfully. However, it does have the disadvantage of requiring relatively large amount of space.

When it desired to build pressurized-gas insulated high-voltage switching installations for several phase-conductors in the most compact arrangement possible, it is necessary to provide a configuration of the multi-pole grounding switch device which requires a minimum of space.

SUMMARY OF THE INVENTION

It is an object of the invention to provide a combination of a pressurized-gas insulated high-voltage switching installation and multi-pole grounding switching device wherein the space required to accommodate the switching device is minimal. Subsidiary to this object, it is an object of the invention to provide such a combination wherein the longitudinal dimension of the metal enclosure of the switching installation is reduced by approximately one-third compared to conventional switching installations.

The combination according to the invention includes as a feature a pressurized-gas insulated high-voltage installation having a metal housing for accommodating a plurality of phase-conductors and at least one multi-pole grounding switch device including a plurality of ground switching pins corresponding to respective ones of the phase-conductors. Each of the switching pins being movable between open and closed positions to disconnect and connect the corresponding phase-conductor electrically with the metal housing, the switching pins being disposed in a radially extending plane transverse to the metal housing and being arranged in spaced relation one from the other about the periphery of the housing.

The invention achieves a reduction in the longitudinal dimension of the metal encapsulation of about one-third of the known arrangements. In a three-phase system, the grounding switch pins are displaced by 120° relative to each other, that is, the switch pins are distributed uniformly over the periphery of the encapsulation. It is advantageous for each switching pin to have a separate drive.

In a preferred embodiment the grounding switch pins are arranged in a common section of the encapsulation together with a three-pole encapsulated disconnect switch.

If the grounding switch device is associated with an outgoing-cable equipment, the grounding switch pins are preferably equipped with a stored-power actuator, as disclosed in Siemens Zeitschrift, No. 4, 1966, p. 363, and are constructed to be secure in the closed position. However, it is also possible instead of configuring the grounding switch device as an output grounding switch, to use operational grounding switches, which need not be secure against opening and are as a rule associated with the power circuit breaker.

Although the invention is illustrated and described herein as the combination of a pressurized-gas insulated high- voltage switching installation and grounding switch device, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
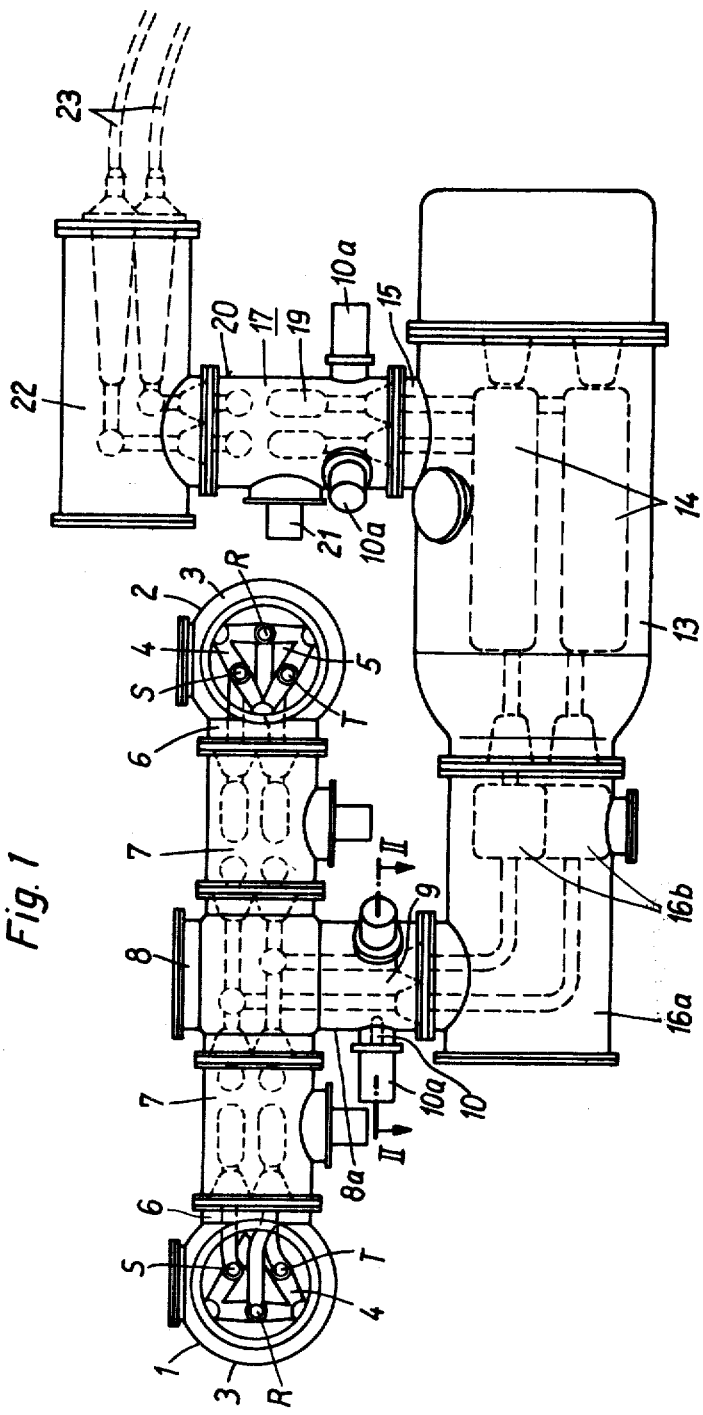
FIG. 1 is a perspective elevation view of the pressurized-gas insulated high-voltage switching installation having a metal enclosure and equipped with a multi-pole grounding switching device according to a preferred embodiment of the invention.

The high-voltage switching system shown in FIG. 1 is intended for operation at a voltage of, for example, 110 kV. Apparatus of this high-voltage switching system are three-phase encapsulated and insulated by sulfur hexafluoride ($SF_6$) at a pressure of, for instance, 2 to 3 bar. The metal encapsulation of the high-voltage switching system is at ground potential.

The installation shown in FIG. 1 is connected to two three-phase-encapsulated bus-bar assemblys 1, 2 which in turn hold the three conductors R, S, T in fixed position by means of preferably identical support insulators 4. The interior is filled with $SF_6$ which serves as the insulating medium. The insulators 4 each are braced on two sides against the encapsulating enclosure 3 of the bus bar assemblys. The bus bar assemblys 1 and 2 have flange parts 6 by which they are connected with the equipments of the installation.

Adjoining the flange parts 6 are two identical, three-phase encapsulated disconnect switches 7 which are connected with each other by a three-phase-encapsulated coupling section 8. The coupling section 8 contains in its encapsulation 8a a grounding switch device 9 having grounding switch pins 10 each provided with a separate drive 10a. In order to reduce the space required, the grounding switch pins 10 and the drives 10a are arranged radial-symmetrically in a common plane which extends transversely to the plane of the drawing.

In the illustrated embodiment, the three conductors R, S, T can be grounded, as necessary, by three grounding switch pins 10. It is advantageous to arrange the grounding switch pins so as to be displaced 120° one with respect to the other as shown in FIG. 2.

Figure 2:
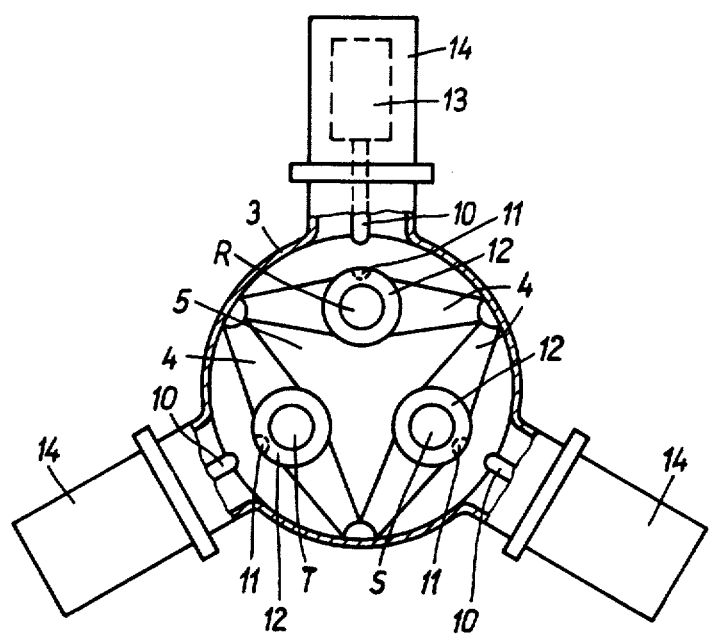
FIG. 2 is a section view taken along the line II—II of FIG. 1 taken through the grounding switching device and on an enlarged scale.

In FIG. 2, the three conductors R, S, T are held in place by means of support insulators 4. At the locations of the conductors R, S, T corresponding to the grounding switch pins 10, switch contacts 11 are provided for engaging the grounding switch pins 10. The switch contacts 11 are surrounded by a spherical shield 12. As shown schematically, each grounding switch pin 10 has an actuator 13 located in a separate housing 14. The drive can also be, for example, a spring drive.

In the installation shown in FIG. 1, the grounding switch device is followed by a cylindrical encapsulating housing 16a, that surrounds three current and/or voltage transformers 16b, associated with respective ones of the individual phase conductors R, S, T. To the housing 16a is connected a power circuit breaker 13 containing the three switch locations 14 for each phase in a common encapsulating enclosure.

The housing of the power circuit breaker 13 is essentially cylindrical and has a flange part 15 which is arranged transversely to the axis of the cylinder and is connected with a disconnect and grounding switch equipment 17 of three-phase encapsulated configuration.

The disconnect and grounding switch equipment 17 represents a further preferred embodiment of the invention. It shows the grounding switch pins 10 also in a radial plane and distributed uniformly over the circumference of the encapsulating enclosure. Each grounding switch pin has its own drive 10a. The grounding switch pins are arranged in a common section 20 of the encapsulating enclosure together with a three-phase encapsulated disconnect switch 19. The switch locations of the disconnect switch 19 have a common drive 21. The encapsulating section 20 is connected with a cable termination apparatus 22 into which the cable 23 is brought. It is also possible to move the grounding switch pins 10 by means of a common drive.

What is claimed is:

1. The combination of a pressurized-gas insulated high-voltage installation having a metal housing for accommodating a plurality of phase-conductors and of at least one multi-pole grounding switch device including a plurality of ground switching pins corresponding to respective ones of the phase-conductors, each of the switching pins being movable between open and closed positions to respectively disconnect and connect the corresponding phase-conductor electrically with the metal housing, the switching pins being disposed in a radially extending transverse to the metal housing and being arranged in spaced relation one from the other about the periphery of the housing.

2. The combination of claim 1 comprising a plurality of actuators for actuating corresponding ones of said switching pins.

3. The combination of claim 1 wherein the switching installation accommodates three phase-conductors, said switching pins being three in number and uniformly spaced one from the other about the periphery of the metal housing at angular spacing of 120°.

4. The combination of claim 3 wherein the switching installation is equipped with a three-pole disconnect switch mounted in a portion of the metal housing, the switching pins of the grounding switch device being mounted with the disconnect switch in the last-mentioned portion of the metal housing.

* * * * *